United States Patent [19]

Ishii et al.

[11] Patent Number: 4,511,491

[45] Date of Patent: Apr. 16, 1985

[54] STABILIZERS FOR SYNTHETIC RESINS

[75] Inventors: Tamaki Ishii, Suita; Shinichi Yachigo; Yukoh Takahashi, both of Toyonaka, all of Japan

[73] Assignee: Sumitomo Chemical Co., Ltd., Osaka, Japan

[21] Appl. No.: 514,021

[22] Filed: Jul. 15, 1983

[30] Foreign Application Priority Data

Jul. 26, 1982 [JP] Japan ................. 57-130634
Dec. 27, 1982 [JP] Japan ................. 57-231293

[51] Int. Cl.$^3$ ............................................. C09K 15/08
[52] U.S. Cl. ................................ 252/404; 252/406; 560/75; 560/152; 549/335
[58] Field of Search ............... 252/404, 406; 560/75, 560/152; 549/335

[56] References Cited

U.S. PATENT DOCUMENTS

| | | | |
|---|---|---|---|
| 3,285,855 | 11/1966 | Dexter et al. | 560/75 |
| 3,457,286 | 7/1969 | Dexter et al. | 260/404 |
| 3,621,034 | 11/1916 | Fruhstorfer et al. | 549/335 |
| 4,032,562 | 6/1928 | Dexter et al. | 560/75 |

FOREIGN PATENT DOCUMENTS 102193 3/1984 European Pat. Off. .
120602 10/1975 Japan .

*Primary Examiner*—Paul Lieberman
*Assistant Examiner*—Hoa Van Le
*Attorney, Agent, or Firm*—Wenderoth, Lind & Ponack

[57] ABSTRACT

Phenolic compounds and methods of producing such phenolic compounds are disclosed, said compounds being of the formula:

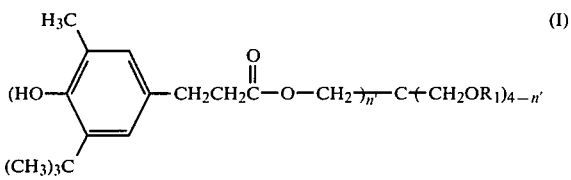

wherein n' is an integer from 1 to 3, and $R_1$ is a hydrogen atom, or an alkyl group having 1 to 4 carbon atoms or an acyl group having 1 to 5 carbon atoms.

These compounds are suitable as stabilizers for synthetic resins with at least one sulfur compound of the following formulas:

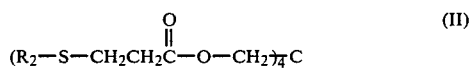

wherein $R_2$ is an alkyl group having 4 to 20 carbon atoms, and

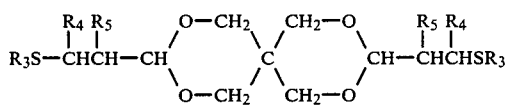

wherein $R_3$ is an alkyl group having 3 to 18 carbon atoms, and $R_4$ and $R_5$ each independently is a hydrogen atom or an alkyl group having 1 to 6 carbon atoms, in the ratio (I):(II) of 1:0.5–15 by weight.

12 Claims, No Drawings

STABILIZERS FOR SYNTHETIC RESINS

The present invention relates to stabilizers for synthetic resins which provide excellent stability to synthetic resins.

Various synthetic resins including polyolefins such as polyethylene, polypropylene, etc., styrene synthetic resins such as polystyrene, impact resistant polystyrene, ABS, etc., engineering plastics such as polyacetal, polyamide, etc., and polyurethane, are widely used in various fields. However, it is well known that when these synthetic resins are used singly, they are not stable enough, that is to say, they deteriorate upon processing or upon use, by the action of heat, light and oxygen, to impair their mechanical properties remarkably, becoming soft, brittle, discolored, and forming cracks on the surface.

To solve this problem, it is also well known to use various phenolic, phosphite-type or sulfur-containing antioxidants. For example, it is known to use singly phenolic type antioxidants such as 2,6-di-t-butyl-4-methylphenol; 2,2'-methylenebis(4-methyl-6-t-butylphenol); 4,4'-butylidenebis(3-methyl-6-t-butylphenol); n-octadecyl 3-(3,5-di-t-butyl-4-hydroxyphenol)propionate; 1,1,3-tris(2-methyl-4-hydroxy-5-t-butylphenol)butane; tetrakis[3-(3,5-di-t-butyl-4-hydroxyphenol)propionyloxymethyl]methane; etc., or to use these phenolic antioxidants together with phosphite-type antioxidants such as tris(nonylphenyl)phosphite; distearylpentaerythritol diphosphite; etc., or to use the above-mentioned phenolic antioxidants in combination with sulfur-containing antioxidants such as dilauryl thiodipropionate; dimyristyl thiodipropionate; distearyl thiodipropionate; etc.

However, these methods are also not yet satisfactory enough in respect of stability to heat and oxidation, discoloration by heat, and vaporization.

In order to solve these problems, we made an intensive study. As a result, we have found that, by mixing synthetic resins with a particular phenolic compound and a particular sulfur-containing compound, it is possible to obtain a surprising synergetic effect which can never be anticipated from conventional techniques of combining antioxidants together, and this mixing provides excellent stability to heat and oxidation to the synthetic resins. The present invention has been accomplished on the basis of this discovery.

The present invention provides a stabilizer for synthetic resins, of which the effective component is a mixture composed of a phenolic compound (I) represented by the general formula (I):

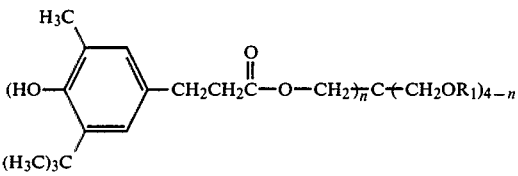

wherein $R_1$ is a hydrogen atom, an alkyl group having 1 to 4 carbon atoms or an acyl group having 1 to 5 carbon atoms, and n is an integer from 1 to 4, and at least one sulfur-containing compound (II) selected from compounds represented by the general formulas (II-1) and (II-2):

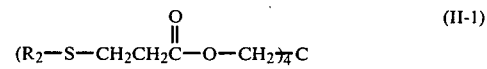

wherein $R_2$ is an alkyl group having 4 to 20 carbon atoms, and

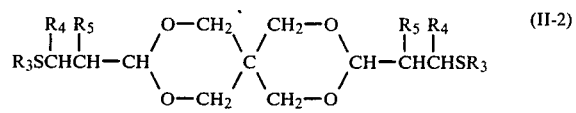

wherein $R_3$ is an alkyl group having 3 to 18 carbon atoms and $R_4$ and $R_5$ each independently is a hydrogen atom or an alkyl group having 1 to 6 carbon atoms, in the ratio (I):(II) of 1:0.5–15 by weight.

In the phenolic compound (I), n and $R_1$ mean as mentioned above. However, in respect of the performance as the stabilizer for synthetic resins, n is preferably 2–4, especially 3–4, and $R_1$ is preferably a hydrogen atom, or $C_{1-2}$ alkyl or acyl such as methyl, ethyl, acetyl.

Examples of such phenolic compounds (I) include tetrakis [3-(3-methyl-5-t-butyl-4-hydroxyphenyl)propionyloxymethyl]methane; 2,2,2-tris[3-(3-methyl-5-t-butyl-4-hydroxyphenyl)propionyloxymethyl]ethyl acetate; 2,2,2-tris[3-(3-methyl-5-t-butyl-4-hydroxyphenyl)-propionyloxymethyl]-1-methoxyethane, etc.

Among these phenolic compounds (I), those wherein n is 1 to 3 are new compounds, and these can be produced by reacting a 3-(3-methyl-5-t-butyl-4-hydroxyphenyl)propionic acid represented by the general formula (III):

wherein R is a hydrogen atom or an alkyl group having 1 to 4 carbon atoms
with a pentaerythritol represented by the general formula (IV):

wherein n and $R_1$ have the same meaning as mentioned above, in the molar ratio of 0.5–4:1, in the presence of an acid or alkaline catalyst.

Example of such catalysts include proton acids such as p-toluenesulfonic acid, sulfuric acid, hydrochloric acid, methanesulfonic acid, etc., Lewis acids such as aluminum chloride, zinc chloride, titanium tetrachloride, boron trifluoride, etc., and basic catalysts such as potassium hydroxide, sodium hydroxide, lithium hydroxide, lithium aluminum hydride, sodium boron hydride, sodium hydride, lithium hydride, sodium amide, sodium-t-butoxide, potassium-t-butoxide, sodium methoxide, potassium methoxide, sodium phenoxide, potassium phenoxide, metallic sodium, metallic potassium, etc. Among others, the use of potassium-t-butoxide, sodium methoxide, sodium phenoxide or sodium hydroxide is preferable.

These catalysts are used in an amount of 0.001 to 2 mol equivalents for the pentaerythritol (IV).

The reaction is proceeds in an organic solvent such as toluene, xylene, dimethylformamide, dimethyl sulfoxide, etc., though it proceeds without using any solvent.

The reaction is carried out at a temperature between 100° and 300° C., preferably between 130° and 200° C. Preferably, the reaction is completed at a reduced pressure of 60–0.1 mm Hg at the terminal stage.

In the compounds represented by the general formula (II-1), the substituent $R_2$ is preferably an alkyl group having 6 to 18 carbon atoms in respect of stability to heat and oxidation, and most preferred is dodecyl group.

Representative examples of such compounds are shown in Table 1.

TABLE 1

$$(R_2-S-CH_2CH_2\overset{\overset{O}{\|}}{C}-O-CH_2)_4C$$

| Compound no. | $R_2$ |
|---|---|
| II-1-1 | $-C_6H_{13}$ |
| II-1-2 | $-C_{12}H_{25}$ |
| II-1-3 | $-C_{18}H_{37}$ |

In the compounds represented by the general formula (II-2), it is preferable that the substituent $R_3$ is an alkyl group having 12 to 18 carbon atoms, and $R_4$ and $R_5$ is a hydrogen atom or an alkyl group having 1 to 3 carbon atoms, in respect of stability to heat and oxidation.

Representative examples of such compounds are shown in Table 2.

TABLE 2

$$\begin{array}{c} R_4\ R_5 \quad\quad O-CH_2\ \ CH_2-O \quad\quad R_5\ R_4 \\ |\ \ | \quad\quad\ \ \diagup\ \ \diagdown\ \diagup\ \ \diagdown \quad\quad |\ \ | \\ R_3SCHCH-CH \quad\quad C \quad\quad CH-CHCHSR_3 \\ \quad\quad\quad\ \ \diagdown\ \ \diagup\ \ \diagdown\ \diagup \\ \quad\quad\quad\ \ O-CH_2\ \ CH_2-O \end{array}$$

| Compound no. | $R_3$ | $R_4$ | $R_5$ |
|---|---|---|---|
| II-2-1 | $-C_8H_{17}$ | $-CH_3$ | $-H$ |
| II-2-2 | $-C_{12}H_{25}$ | $-C_4H_9$ | $-H$ |
| II-2-3 | $-C_{12}H_{25}$ | $-CH_3$ | $-H$ |
| II-2-4 | $-C_{18}H_{37}$ | $-CH_3$ | $-H$ |
| II-2-5 | $-C_{12}H_{25}$ | $-H$ | $-H$ |
| II-2-6 | $-C_{18}H_{37}$ | $-H$ | $-CH_3$ |

The stabilizer for synthetic resins of the present invention is composed of a mixture of a phenolic compound (I) represented by the general formula (I) and at least one sulfur-containing compound (II) selected from the compounds represented by the general formulas (II-1), and (II-2), and the mixting ratio (I):(II) by weight is 1:0.5–15, preferably 1:1–10, and more preferably 1:2–6.

When the sulfur-containing compound (II) is less than 0.5 times by weight for the phenolic compound (I), the desired effect cannot be fully attained. Also, even when it exceeds 15 times by weight, the effect obtained does not become correspondingly large, which is unfavorable economically.

The mixing amount of the stabilizer for synthetic resins of the present invention with synthetic resins is usually 0.01–5 weight parts and preferably 0.05–1 weight part for 100 weight parts of synthetic resin. Upon use, the phenolic compound (I) and the sulfur-containing compound (II) may be mixed separately with the synthetic resin, without previously preparing a mixture of the compounds.

Upon use of the stabilizer for synthetic resins of the present invention, other additives, for example, ultraviolet absorber, light stabilizer, antioxidant, metal deactivator, metallic soap, nucleating agent, lubricant, antistatic agent, flame retardant, pigment, filler, etc. may be used in combination.

The resistance to light of the synthetic resin can be improved by using the stabilizer of the present invention together with ultraviolet absorbers, hindered amine type light-stabilizers, etc. for example, 2-hydroxy-4-methoxybenzophenone, 2-hydroxy-4-n-octoxybenzophenone, 2(2-hydroxy-5-methylphenyl)benzotriazole, 2(2-hydroxy-3-t-butyl-5-methylphenyl)-5-chlorobenzotriazole, 2(2-hydroxy-3,5-di-t-butylphenyl)-5-chlorobenzotriazole, 2(2-hydroxy-3,5-diamylphenyl)benzotriazole, [2,2'-thiobis(4-t-octylphenolate)]-butylamine nickel salt, 2,2,6,6-tetramethyl-4-piperidinyl benzoate, bis(2,2,6,6-tetramethyl-4-piperidinyl)sebacate, bis(1,2,2,6,6-pentamethyl-4-piperidyl)2-(3,5-di-t-butyl-4-hydroxybenzyl)-2-n-butylmalonate, 1-[2-{3-(3,5-d-t-butyl-4-hydroxyphenyl)propionyloxy}ethyl]-4-[3-(3,5-di-t-butyl-4-hydroxyphenyl)propionyloxy]-2,2,6,6-tetramethylpiperidine, and dimethyl succinate/1-(2-hydroxyethyl)-4-hydroxy-2,2,6,6-tetramethylpiperidine condensation product.

By using the stabilizer of the present invention together with other phosphite-type antioxidants, the color of the synthetic resin can be improved. Such phosphite-type antioxidants include, for example, distearylpentaerythritol diphosphite, tris(2,4-di-t-butyl phenyl)phophite, bis(2,4-di-t-butylphenyl)pentaerythritol diphosphite, tetrakis(2,4-di-t-butylphenyl)-4,4'-biphenylene diphosphite, etc.

By using the stabilizer for synthetic resins of the present invention, the stability of synthetic resins is greatly improved. Example of such synthetic resins include low density polyethylene, high density polyethylene, linear low density polyethylene, chlorinated polyethylene, EVA resin, polypropylene, polyvinyl chloride, methacrylic resin, polystyrene, impact resistant polystyrene, ABS resin, AES resin, MBS resin, polyethylene terephthalate, polybutylene, terephthalate, polyamide, polyimide, polycarbonate, polyacetal, polyurethane, unsaturated polyester resin, etc. Among others, the stabilizer is effective for polypropylene.

EXAMPLE OF PRODUCTION 1

Production of tetrakis[3-(3-methyl-5-t-butyl-4-hydroxyphenyl)propionyloxymethyl]methane (Compound I-1)

30.04 g (0.12 mol) of methyl 3-(3-t-butyl-5-methyl-4-hydroxyphenyl)propionate and 2.72 g (0.02 mol) of pentaerythritol were mixed. To this mixture, 0.135 g (0.0025 mol) of sodium methoxide was added, and the reaction system was heated. After reaction at 140° C. for one hour, the pressure of the reaction system was reduced, and at a pressure between 30 and 20 mm Hg and at a temperature between 140° and 150° C., the system was reacted for an additional period of 20 hours. During this reaction, each ⅓ portion of 0.405 g (0.0075 mol) sodium methoxide was added with the progress of the reaction.

After the completion of the reaction, the internal temperature was cooled to 80° C., and after neutralization of the catalyst with hydrochloric acid, 200 g toluene was added to separate the solution. After washing the toluene phase with water, toluene was distilled away under reduced pressure. The thus-obtained crude product (30.07 g; yield 96%) was of 91% purity. This was purified by silica gel column chromatography to obtain 15.9 g of a glass-like product with a purity of 98%. Melting point: 45°–55° C.

Elemental analysis for $C_{61}H_{84}O_{12}$. Calculated: C 72.6%, H 8.4%. Found: C 72.3%, H 8.6%.

Mass analysis (FD-mass). Molecular ion peak: 1008.

Proton-NMR: δ1.39 (36H s), δ2.18 (12H s), δ2.71 (16H m), δ3.93 (8H s), δ4.7 (4H br. s), δ6.85 (4H s), δ6.98 (4H s).

EXAMPLE OF PRODUCTION 2

Production of 2,2,2-tris[3-(3-methyl-5-t-butyl-4-hydroxyphenyl)propionyloxymethyl]ethanol (Compound I-2)

12.52 g (0.050 mol) of methyl 3-(3-methyl-5-t-butyl-4-hydroxyphenyl)propionate and 2.72 g (0.020 mol) of pentaerythritol were mixed. To this mixture, 0.135 g (0.0025 mol) of sodium methoxide was added, and the reaction system was heated. After reaction at 140° C. for one hour, the pressure of the reaction system was reduced, and at a pressure between 25 and 20 mm Hg and at a temperature between 140° and 150° C., the system was reacted for an additional period of 30 hours. During this reaction, each ⅓ portion of 0.405 g (0.0075 mol) sodium methoxide was added with the progress of the reaction.

After the completion of the reaction, the internal temperature was cooled to 80° C., and after neutralization of the catalyst with hydrochloric acid, 200 g toluene was added to separate the solution. After washing the toluene phase with water, toluene was distilled away under reduced pressure. The thus-obtained crude product (13.0 g; yield 99%) was of 78% purity. This was purified by silica gel chromatography to obtain a 6.7 g colorless glass-like product with a purity of 96%. Melting point: 40°–50° C.

Elemental analysis for $C_{47}H_{66}O_{10}$. Found: C 71.6%, H 8.1%. Calculated: C 71.4%, H 8.4%.

Mass analysis (FD-mass). Molecular ion peak: 790

Proton-NMR: δ1.39 (27H s), δ2.18 (9H s), δ2.70 (12H m), δ3.26 (2H s), δ3.95 (6H s), δ4.97 (4H br. s), δ6.79 (3H s), δ6.92 (3H s).

EXAMPLE OF PRODUCTION 3

Production of 2,2,2-tris[3-(3-methyl-5-t-butyl-4-hydroxyphenyl)propionyloxymethyl]ethyl acetate (Compound I-3)

By acetylating in the usual way the compound (I-2) obtained in Example of production 2, a reddish brown viscous product was obtained.

Elemental analysis for $C_{49}H_{68}O_{11}$. Found: C 70.2%, H 7.8%, Calculated: C 70.7%, H 8.2%.

Mass analysis (FD-mass). Molecular ion peak: 832.

Proton-NMR: δ1.39 (27H s), δ2.17 (3H s), δ2.19 (9H s), δ2.71 (12H m), δ3.92 (8H s), δ4.75 (3H br. s), δ6.83 (3H s), δ6.97 (3H s).

EXAMPLE OF PRODUCTION 4

Production of 2,2,2-tris[3-(3-methyl-5-t-butyl-4-hydroxyphenyl)propionyloxymethyl]-1-methoxyethane (Compound I-4)

In place of pentaerythritol in the Example of production 2, pentaerythritol monomethyl ether was used. By reacting under the same reaction condition, a reddish brown viscous product was obtained.

Elemental analysis for $C_{48}H_{68}O_{10}$. Found: C 71.2%, H 8.1%, Calculated: C 71.6%, H 8.5%.

Mass analysis (FD-mass) Molecular ion peak: 804.

Proton-NMR: δ1.39 (27H s), δ2.18 (9H s), δ2.70 (12H m), δ3.15 (3H s), δ3.27 (2H s), δ3.94 (6H s), δ4.95 (3H br. s), δ6.18 (3H s), δ6.93 (3H s).

EXAMPLE OF EXECUTION 1

The following components were mixed for 5 minutes with a mixer, and melt-kneaded with a mixing roll at 180° C. The compound thus obtained was formed by a heated press of 210° C. into a sheet of 1 mm in thickness. A test piece of the dimensions of 40×40×1 mm was produced. The time until 30% of the area of the test piece becomes brittle in a gear oven of 160° C. was measured. This time period was determined as the induction period to embrittlement, by which the stability to heat and oxidation was evaluated. The results are shown in Table 3.

Components:

| Non-stabilized polypropylene resin | 100 weight parts |
| Calcium stearate | 0.1 weight part |
| Test compound | variable |

In Table 3, the signs of the test compounds show the following compounds:

AO-1: n-octadecyl 3-(3,5-di-tert-butyl-4-hydroxyphenyl)propionate,

AO-2: tetrakis[3-(3,5-di-t-butyl-4-hydroxyphenyl)propionyloxymethyl]methane,

AO-3: 1,3,5-trimethyl-2,4,6-tris(3,5-di-t-butyl-4-hydroxybenzyl)benzene,

AO-4: 1,1,3-tris(2-methyl-4-hydroxy-5-t-butylphenyl)butane,

AO-5: dilauryl thiodipropionate,

AO-6: distearyl thiodipropionate.

TABLE 3

Example of the Invention

| Test compound | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|
| Phenolic | | | | | | | | | | | | | | | | | | | | | | | | | | | | |
| I-1 | 0.05 | 0.05 | 0.05 | 0.05 | 0.05 | 0.05 | 0.05 | 0.05 | 0.05 | 0.05 | 0.05 | 0.05 | 0.05 | | | | | | | | | | | | | | | |
| I-2 | | | | | | | | | | | | | | 0.05 | 0.05 | 0.05 | 0.05 | 0.05 | 0.05 | 0.05 | 0.05 | 0.05 | 0.05 | 0.05 | 0.05 | | | |
| I-3 | | | | | | | | | | | | | | | | | | | | | | | | | | 0.05 | 0.05 | |
| I-4 | | | | | | | | | | | | | | | | | | | | | | | | | | | | 0.05 |
| AO-1 | | | | | | | | | | | | | | | | | | | | | | | | | | | | |
| AO-2 | | | | | | | | | | | | | | | | | | | | | | | | | | | | |
| AO-3 | | | | | | | | | | | | | | | | | | | | | | | | | | | | |
| AO-4 | | | | | | | | | | | | | | | | | | | | | | | | | | | | |
| Sulfur-containing | | | | | | | | | | | | | | | | | | | | | | | | | | | | |
| II-1-1 | 0.2 | | | | | | | | | | | | | | | | | | | | | | | | | | | |
| II-1-2 | | 0.1 | 0.2 | 0.3 | | | | | 0.1 | 0.2 | 0.3 | | | | 0.1 | 0.2 | 0.3 | | | | | 0.1 | 0.2 | 0.3 | | | 0.2 | 0.2 |
| II-1-3 | | | | | 0.2 | | | | | | | | | 0.2 | | | | | | | | | | | 0.2 | | | |
| II-2-1 | | | | | | 0.2 | | | | | | | | | | | | 0.2 | | | | | | | | | | |
| II-2-2 | | | | | | | 0.2 | | | | | | | | | | | | 0.2 | | | | | | | | | |
| II-2-3 | | | | | | | | 0.2 | | | | | | | | | | | | 0.2 | | | | | | | | |
| II-2-4 | | | | | | | | | | | | | 0.2 | | | | | | | | 0.2 | | | | | | | |
| II-2-5 | | | | | | | | | | | | 0.2 | | | | | | | | | | | | | | 0.2 | | |
| II-2-6 | | | | | | | | | | | | | | | | | | | | | | | | | | | | |
| AO-5 | | | | | | | | | | | | | | | | | | | | | | | | | | | | |
| AO-6 | | | | | | | | | | | | | | | | | | | | | | | | | | | | |
| Induction period to embrittlement (hours) | 1290 | 1190 | 1600 | 1990 | 1420 | 1310 | 1440 | 1500 | 1170 | 1580 | 1920 | 1500 | 1570 | 1260 | 1070 | 1570 | 1750 | 1390 | 1270 | 1400 | 1460 | 1050 | 1540 | 1710 | 1470 | 1480 | 1270 | 1590 |

Example of the invention (continued)

| Test compound | 29 | 30 | 31 | 32 | 33 | 34 | 35 | 36 | 37 | 38 | 39 | 40 | 41 | 42 | 43 | 44 | 45 | 46 |
|---|---|---|---|---|---|---|---|---|---|---|---|---|---|---|---|---|---|---|
| Phenolic | | | | | | | | | | | | | | | | | | |
| I-1 | 0.05 | 0.05 | 0.05 | 0.05 | 0.05 | 0.05 | 0.05 | | | | | | | | | | | |
| I-2 | | | | | | | | 0.05 | 0.05 | 0.05 | | | | | | | | |
| I-3 | | | | | | | | | | | 0.05 | 0.05 | 0.05 | 0.05 | | | | |
| I-4 | | | | | | | | | | | | | | | 0.05 | 0.05 | 0.05 | 0.05 |
| AO-1 | | | | | | | | | | | | | | | | | | |
| AO-2 | | | | | | | | | | | | | | | | | | |
| AO-3 | | | | | | | | | | | | | | | | | | |
| AO-4 | | | | | | | | | | | | | | | | | | |
| Sulfur-containing | | | | | | | | | | | | | | | | | | |
| II-1-1 | | | | | | | | | | | | | | | | | | |
| II-1-2 | 0.2 | | | | | | | | | | | | | | | | | |
| II-1-3 | | | 0.2 | | | | | | | | | | | | | | | |
| II-2-1 | | 0.2 | | 0.2 | | | | | | | | | | | | | | |
| II-2-2 | | | | | 0.2 | | | | | | | | | | | | | |
| II-2-3 | | | | | | 0.2 | | | 0.2 | | | | | | | | | |
| II-2-4 | | | | | | | 0.2 | | | | | | | | | | | |
| II-2-5 | | | | | | | | 0.2 | | 0.2 | | | | | | | | |
| II-2-6 | | | | | | | | | | | | | | | | | | |

Example of Comparison

| Test compound | 47 | 48 | 49 | 50 | 51 | 52 | 53 | 54 | 55 | 56 | 57 | 58 | 59 | 60 |
|---|---|---|---|---|---|---|---|---|---|---|---|---|---|---|
| Phenolic | | | | | | | | | | | | | | |
| I-1 | 0.2 | | | | | | | | | | | | | |
| I-2 | | 0.2 | | | | | | | | | | | | |
| I-3 | | | 0.2 | | | | | | | | | | | |
| I-4 | | | | 0.2 | | | | | | | | | | |
| AO-1 | | | | | 0.2 | | | | | | | | | |
| AO-2 | | | | | | 0.2 | | | | | | | | |
| AO-3 | | | | | | | 0.2 | | | | | | | |
| AO-4 | | | | | | | | 0.2 | | | | 0.05 | 0.05 | 0.05 |
| Sulfur-containing | | | | | | | | | | | | | | |
| II-1-1 | | | | | | | | | | | | | | |
| II-1-2 | | | | | | | | | 0.2 | | | | | |
| II-1-3 | | | | | | | | | | 0.2 | | | | |
| II-2-1 | | | | | | | | | | | 0.2 | | | |
| II-2-2 | | | | | | | | | | | | | | |
| II-2-3 | | | | | | | | | | | | | | |
| II-2-4 | | | | | | | | | | | | | | |
| II-2-5 | | | | | | | | | | | | | | |
| II-2-6 | | | | | | | | | | | | | | |

TABLE 3-continued

|  | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 | 85 |
|---|---|---|---|---|---|---|---|---|---|---|---|---|---|---|---|---|---|---|---|---|---|---|---|---|---|
| AO-5 |  |  |  |  |  |  |  |  |  |  |  |  |  |  |  |  |  |  |  |  |  |  |  | 0.2 | 0.2 |
| AO-6 |  |  |  |  |  |  |  |  |  |  |  |  |  |  |  |  |  |  |  |  |  |  |  |  | 0.2 |
| Induction period to embrittlement (hours) | 1400 | 1300 | 1420 | 1490 | 1560 | 1480 | 1490 | 1600 | 1570 | 1490 | 150 | 120 | 130 | 130 | 30 | 40 | 25 | 30 | 30 | 20 | 20 | 20 | 20 | 15 | 15 |

| | Example of comparison | | | | | | | | | | | | | | | | | | | | | | | | NON-ADDITION |
|---|---|---|---|---|---|---|---|---|---|---|---|---|---|---|---|---|---|---|---|---|---|---|---|---|---|
| Test compound | 61 | 62 | 63 | 64 | 65 | 66 | 67 | 68 | 69 | 70 | 71 | 72 | 73 | 74 | 75 | 76 | 77 | 78 | 79 | 80 | 81 | 82 | 83 | 84 | 85 |
| Phenolic | | | | | | | | | | | | | | | | | | | | | | | | | |
| I-1 | 0.05 | | | | | | | | | | | | | | | | | | | | | | | | |
| I-2 | | 0.05 | | | | | | | | | | | | | | | | | | | | | | | |
| I-3 | | | 0.05 | | 0.05 | | | | | | | | | | | | | | | | | | | | |
| I-4 | | | | 0.05 | 0.05 | | | | | | | | | | | | | | | | | | | | |
| AO-1 | | | | | | 0.05 | | | | | | | | | | | | | | | | | | | |
| AO-2 | | | | | | | 0.05 | 0.05 | | | | | | | | | | | | | | | | | |
| AO-3 | | | | | | | | | 0.05 | 0.05 | | | | | | | | | | | | | | | |
| AO-4 | | | | | | | | | | | | | | | | | | 0.05 | 0.05 | 0.05 | 0.05 | 0.05 | 0.05 | | |
| Sulfur-containing | | | | | | | | | | | | | | | | | | | | | | | | | |
| II-1-1 | | | | | | | | | | | 0.2 | | | | | | | | | | | | | | |
| II-1-2 | | | | | | 0.2 | | | 0.2 | | | 0.2 | | | | | | 0.2 | | | | 0.2 | | | |
| II-1-3 | | | | | | | | | | 0.3 | | 0.3 | | | | | | | | | | | | | |
| II-2-1 | | | | | | | 0.2 | | | | | | 0.2 | | | | | | 0.2 | | | | | | |
| II-2-2 | | | | | | | | 0.2 | | | | | 0.3 | | | | | | | 0.2 | | | 0.2 | | |
| II-2-3 | | | | | | | | | | | | | | 0.2 | | | | | | | | | | 0.2 | |
| II-2-4 | | | | | | | | | | | | | | | | | | | | | | | | | |
| II-2-5 | | | | | | | | | | | | | | | 0.3 | 0.2 | 0.3 | | | | | | | | |
| II-2-6 | | | | | | | | | | | | | | | | | | | | | 0.2 | | | | |
| AO-5 | 0.2 | 0.2 | 0.2 | 0.2 | 0.2 | | | 0.2 | | | | | | | | | | | | | 0.2 | | | 0.2 | |
| AO-6 | | | | | | | | | | | | | | | | | | | | | | | | | |
| Induction period to embrittlement (hours) | 580 | 440 | 600 | 440 | 610 | 310 | 320 | 330 | 400 | 480 | 390 | 440 | 530 | 450 | 500 | 750 | 820 | 490 | 460 | 380 | 670 | 510 | 430 | 390 | 5 |

EXAMPLE OF EXECUTION 2

To a graft ABS latex, suspensions, produced by bead-peptization with an anionic surface-active agent, of the test compounds shown in Table 4 were added in amounts shown in Table 4. In the usual way, the mixture was salted out with an aqueous magnesium sulfate solution, and the resulting precipitate was filtered, washed with water and dried. The stability to heat and oxidation was evaluated by the following methods, using the ABS resin powder thus obtained as the test material. The results are shown in Table 4.

1. After heat-ageing in a gear oven at 180° C., the degree of discoloration of the ABS resin was observed,
2. The oxygen absorption induction period (I.P.) was measured in an oxygen atmosphere at 170° C., using an oxygen absorption induction period measuring apparatus,
3. The ABS resin powder was extruded repeatedly using a small extruder (screw $D=20$ mm $\phi$, $L/D=25$, strand die $D=3$ mm $\phi$, $L/D=10$) under the following condition. The degree of the discoloration of the ABS pellets of the forth extrusion was evaluated by the color difference $\Delta YI$ from the non-addition ABS pellets of the first extrusion.

Extrusion condition:

| Number of rotation: | 40 rpm | | | |
|---|---|---|---|---|
| Temperature: | $C_1$ | $C_2$ | $C_3$ | D |
| | 220° | 240° | 260° | 280° |

4. The ABS pellets after the forth extrusion obtained in the above-mentioned method of paragraph 3 was compression-molded at 180° C. for 10 minutes to prepare a No. 1 Test Piece specified in JIS K 7111. By using a Charpy impact testing machine, the Charpy impact value of the Test Piece was measured, following JIS K 7111.

In Table 4, AO-7 is the following compound:
AO-7: 2,6-di-t-butyl-4-methylphenol.

TABLE 4

| | Examples of the invention | | | | | | | | | | | | | | | | | | | | Example of comparison | | |
|---|---|---|---|---|---|---|---|---|---|---|---|---|---|---|---|---|---|---|---|---|---|---|---|
| Test compound | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Phenolic | | | | | | | | | | | | | | | | | | | | | | |
| I-1 | 0.5 | 0.5 | 0.5 | 0.5 | 0.5 | 0.5 | | | | | | | | | | | | | | | | 0.5 |
| I-2 | | | | | | | 0.5 | 0.5 | 0.5 | 0.5 | 0.5 | 0.5 | | | | | | | | | | |
| I-3 | | | | | | | | | | | | | 0.5 | 0.5 | 0.5 | 0.5 | 0.5 | | | | | |
| I-4 | | | | | | | | | | | | | | | | | | 0.5 | 0.5 | 1.0 | | |
| AO-2 | | | | | | | | | | | | | | | | | | | | | 0.5 | |
| AO-7 | | | | | | | | | | | | | | | | | | | | | | |
| Sulfur-containing | | | | | | | | | | | | | | | | | | | | | | |
| II-1-2 | 0.5 | 1.0 | | | | | 0.5 | 1.0 | | | | | 0.5 | | | | | | | | | |
| II-2-4 | | | 0.5 | 1.0 | | | | | 0.5 | 1.0 | | | | 0.5 | | | 0.5 | | | | | |
| II-2-5 | | | | | 0.5 | 1.0 | | | | | 0.5 | 1.0 | | | 0.5 | 0.5 | | 0.5 | | | | |
| AO-5 | | | | | | | | | | | | | | | | | | | 0.5 | 1.0 | 0.5 | 1.0 |
| Discoloration | | | | | | | | | | | | | | | | | | | | | | |
| after 30 min. | light yellow | light yellow | light yellow | light yellow | light yellow | light yellow | light yellow | light yellow | light yellow | light yellow | light yellow | light yellow | light yellow | light yellow | light yellow | light yellow | light yellow | light yellow | deep brown | yellow brown | yellow brown | yellow brown |
| after 60 min. | yellow brown | yellow brown | yellow brown | yellow brown | yellow brown | yellow brown | yellow brown | yellow brown | yellow brown | yellow brown | yellow brown | yellow brown | yellow brown | yellow brown | yellow brown | yellow brown | yellow brown | yellow brown | black | deep brown | brown | brown |
| Oxygen absorption induction period (min.) | 210 | 270 | 205 | 260 | 210 | 265 | 190 | 255 | 185 | 240 | 190 | 250 | 200 | 195 | 200 | 205 | 200 | 205 | 140 | 165 | 145 | 170 |
| Δ YI | 10.9 | 10.3 | 11.0 | 10.7 | 10.9 | 10.5 | 10.9 | 10.6 | 11.0 | 10.8 | 11.2 | 10.6 | 10.7 | 10.8 | 11.0 | 10.6 | 10.7 | 10.9 | 14.2 | 14.0 | 14.6 | 14.7 |
| Charpy impact value (Kg f.cm/cm) | 21.2 | 21.7 | 20.3 | 20.9 | 20.7 | 21.2 | 19.5 | 20.0 | 19.0 | 19.4 | 19.3 | 19.7 | 20.7 | 20.2 | 20.4 | 20.8 | 20.4 | 20.5 | 11.9 | 13.0 | 12.1 | 13.2 |

| | Examples of comparison | | | | | | | | | | | | | | | | | | | | |
|---|---|---|---|---|---|---|---|---|---|---|---|---|---|---|---|---|---|---|---|---|---|
| Test compound | 23 | 24 | 25 | 26 | 27 | 28 | 29 | 30 | 31 | 32 | 33 | 34 | 35 | 36 | 37 | 38 | 39 | 40 | 41 | 42 | 43 |
| Phenolic | | | | | | | | | | | | | | | | | | | | | |
| I-1 | 0.5 | 0.5 | | | | | | | | | | | | | | | | | | | non-addition |
| I-2 | | | 0.5 | | | | 0.5 | 1.0 | | | | | | | | | | | | | |
| I-3 | | | | 0.5 | 0.5 | | | | | | | | | | | | | | | | |
| I-4 | | | | | | 0.5 | | | 0.5 | | | | | | | | | | | | |
| AO-2 | | | | | | | | | | 0.5 | 0.5 | 0.5 | 0.5 | 0.5 | 0.5 | 1.0 | | | 0.5 | | |
| AO-7 | | | | | | | | | | | | | | | | | 0.5 | 0.5 | | 0.5 | |
| Sulfur-containing | | | | | | | | | | | | | | | | | | | | | |
| II-1-2 | | | | | | | | | 0.5 | | 0.5 | | | | | | | | | | |
| II-2-4 | | | | | 0.5 | | | | | 1.0 | | 0.5 | | 0.5 | | | | | | | |
| II-2-5 | | | | | | | | | | | | | 1.0 | | 1.0 | | 0.5 | 0.5 | | | |
| AO-5 | | 0.5 | | 0.5 | | | | | | | | | | | | | | | 0.5 | 0.5 | |
| Discoloration | | | | | | | | | | | | | | | | | | | | | |
| after 30 min. | deep yellow | yellow | deep yellow | yellow | deep yellow | yellow | deep yellow | yellow | yellow | yellow | yellow | yellow | yellow | yellow | yellow | yellow | deep | deep | deep | deep | deep |

TABLE 4-continued

| | | | | | | | | | | | | | | | | | |
|---|---|---|---|---|---|---|---|---|---|---|---|---|---|---|---|---|---|
| after 60 min. | brown black brown | brown brown | brown black brown | brown brown | brown black brown | brown brown | brown black brown | brown deep brown | brown brown | brown brown | brown brown | brown brown | brown brown | brown brown | brown black brown | brown black brown | brown black brown | brown black brown |
| Oxygen absorption induction period (min.) | 130 | 135 | 135 | 140 | 135 | 140 | 140 | 165 | 145 | 155 | 145 | 155 | 145 | 145 | 150 | 150 | 150 | 140 | 10 |
| ΔYI | 14.2 | 14.1 | 14.0 | 14.2 | 14.1 | 14.3 | 13.9 | 13.7 | 14.5 | 14.7 | 14.3 | 14.8 | 14.5 | 14.6 | 14.9 | 13.2 | 14.5 | 14.6 | 14.8 | 15.0 | 15.9 |
| Charpy impact value (Kg f.cm/cm) | 11.3 | 11.6 | 11.7 | 11.9 | 11.7 | 11.9 | 11.5 | 12.7 | 11.7 | 12.9 | 11.6 | 13.0 | 11.6 | 11.4 | 13.5 | 12.8 | 12.4 | 12.5 | 12.4 | 11.7 | 7.2 |

Note: The amount of test compound added is by weight of solid matter for 100 weight parts of the solid matter of resin

EXAMPLE OF EXECUTION 3

To a 25% urethane dope (prepared from 25 parts of urethane resin, 3.75 parts of dimethylformamide and 71.25 parts of tetrahydrofuran), each of the test compounds shown in Table 5 was added in an amount by weight parts shown in Table 5 for 100 weight parts of the above-mentioned polyurethane. Thereafter, the resulting dope was coated in 1.2 mm thickness on a polyester film, and was dried at 45° C. for one hour in a drier. The sheet thus obtained was punched out into test pieces by a No. 3 Dumbbell.

After irradiated with light for 60 hours and 120 hours in a Fade-O-Meter (light source: UV carbon arc; black panel temperature: 63°±3° C.), the test pieces were subjected to a tensile test (tensile speed: 200 mm/min; measurement temperature: 25° C.) to obtain the retension ratio of break strength.

The results are shown in Table 5.

TABLE 5

| Test compound | Example of the invention |||||||||||
|---|---|---|---|---|---|---|---|---|---|---|---|
| | 1 | 2 | 3 | 4 | 5 | 6 | 7 | 8 | 9 | 10 | 11 |
| I-1 | 0.5 | 0.5 | 0.5 | 0.5 | 0.5 | 0.5 | | | | | |
| I-2 | | | | | | | 0.5 | 0.5 | 0.5 | 0.5 | 0.5 |
| I-3 | | | | | | | | | | | |
| I-4 | | | | | | | | | | | |
| AO-1 | | | | | | | | | | | |
| AO-2 | | | | | | | | | | | |
| II-1-2 | 0.5 | 1.0 | | | | | 0.5 | 1.0 | | | |
| II-2-4 | | | 0.5 | 1.0 | | | | | 0.5 | 1.0 | |
| II-2-5 | | | | | 0.5 | 1.0 | | | | | 0.5 |
| AO-5 | | | | | | | | | | | |
| Break strength retension (%) | | | | | | | | | | | |
| 60 hours | 57 | 61 | 55 | 57 | 56 | 59 | 55 | 58 | 55 | 57 | 56 |
| 120 hours | 40 | 43 | 37 | 40 | 39 | 42 | 36 | 39 | 35 | 38 | 36 |

| Test compound | Example of the invention |||||||Example of comparison|||
|---|---|---|---|---|---|---|---|---|---|---|---|
| | 12 | 13 | 14 | 15 | 16 | 17 | 18 | 19 | 20 | 21 | 22 |
| I-1 | | | | | | | | 0.5 | 1.0 | 0.5 | 0.5 |
| I-2 | 0.5 | | | | | | | | | | |
| I-3 | | 0.5 | 0.5 | 0.5 | | | | | | | |
| I-4 | | | | | 0.5 | 0.5 | 0.5 | | | | |
| AO-1 | | | | | | | | | | | |
| AO-2 | | | | | | | | | | | |
| II-1-2 | | 0.5 | | 0.5 | | 0.5 | | | | | |
| II-2-4 | | | 0.5 | | 0.5 | | | | | | |
| II-2-5 | 1.0 | | 0.5 | | | | 0.5 | | | | |
| AO-5 | | | | | | | | | | 0.5 | 1.0 |
| Break strength retension (%) | | | | | | | | | | | |
| 60 hours | 58 | 56 | 55 | 56 | 55 | 56 | 55 | 35 | 38 | 36 | 37 |
| 120 hours | 39 | 37 | 35 | 36 | 35 | 37 | 36 | 20 | 23 | 22 | 23 |

| Test compound | Example of comparison ||||||||||
|---|---|---|---|---|---|---|---|---|---|---|
| | 23 | 24 | 25 | 26 | 27 | 28 | 29 | 30 | 31 | 32 | 33 |
| I-1 | | | | | | | | | | | |
| I-2 | 0.5 | 0.5 | | | | | | | | | |
| I-3 | | | 0.5 | 0.5 | | | | | | | |
| I-4 | | | | | 0.5 | 0.5 | | | | | |
| AO-1 | | | | | | | 0.5 | 0.5 | 0.5 | 0.5 | 0.5 |
| AO-2 | | | | | | | | | | | |
| II-1-2 | | | | | | | | 0.5 | | | |
| II-2-4 | | | | | | | | | 0.5 | | |
| II-2-5 | | | | | | | | | | 0.5 | |
| AO-5 | | 0.5 | | 0.5 | | 0.5 | | | | | 0.5 |
| Break strength retension (%) | | | | | | | | | | | |
| 60 hours | 33 | 34 | 34 | 35 | 35 | 36 | 31 | 32 | 32 | 32 | 32 |
| 120 hours | 18 | 20 | 19 | 21 | 20 | 22 | 17 | 18 | 17 | 18 | 18 |

| Test compound | Example of comparison ||||||||| |
|---|---|---|---|---|---|---|---|---|---|---|
| | 34 | 35 | 36 | 37 | 38 | 39 | 40 | 41 | 42 | |
| I-1 | | | | | | | | | | |
| I-2 | | | | | | | | | | |
| I-3 | | | | | | | | | | |
| I-4 | | | | | | | | | | |
| AO-1 | | | | | | | | | | |
| AO-2 | 0.5 | 1.0 | 0.5 | 0.5 | 0.5 | 0.5 | 0.5 | 0.5 | Non-addition | |
| II-1-2 | | | 0.5 | 1.0 | | | | | | |
| II-2-4 | | | | | 0.5 | | | | | |
| II-2-5 | | | | | | 0.5 | 1.0 | | | |
| AO-5 | | | | | | | | 0.5 | | |
| Break strength retension (%) | | | | | | | | | | |
| 60 hours | 35 | 38 | 36 | 37 | 36 | 36 | 37 | 36 | 30 | |
| 120 hours | 20 | 22 | 21 | 21 | 20 | 21 | 22 | 20 | 16 | |

What is claimed is:

1. A stabilizer for synthetic resins, of which the effective ingredient is a mixture composed of a phenolic compound (I) represented by the general formula (I):

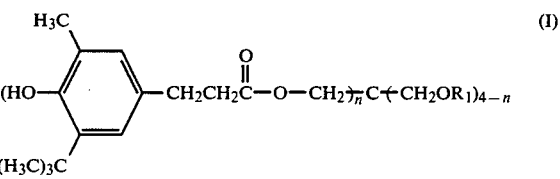

wherein $R_1$ is a hydrogen atom, an alkyl group having 1 to 4 carbon atoms or an acyl group having 1 to 5 carbon atoms; and n is an integer from 1 to 4, and at least one sulfur-containing compound (II) selected from compounds represented by the general formulas (II-1) and (II-2):

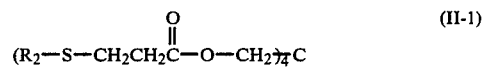

wherein $R_2$ is an alkyl group having 4 to 20 carbon atoms, and

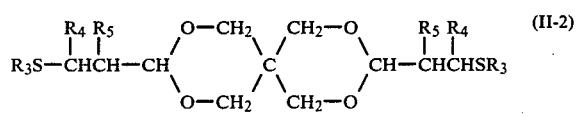

wherein $R_3$ is an alkyl group having 3 to 18 carbon atoms, and $R_4$ and $R_5$ each independently is a hydrogen atom or an alkyl group having 1 to 6 carbon atoms, in the ratio (I):(II) of 1:0.5–15 by weight.

2. The stabilizer for synthetic resins as claimed in claim 1 wherein the phenolic compound (I) is tetrakis[3-(3-methyl-5-t-butyl-4-hydroxyphenyl)propionyloxymethyl]methane, 2,2,2-tris[3-(3-methyl-5-t-butyl-4-hydroxyphenyl)propionyloxymethyl]ethanol, 2,2,2-tris[3-(3-methyl-5-t-butyl-4-hydroxyphenyl)propionyloxymethyl]ethyl acetate, or 2,2,2-tris[3-(3-methyl-5-t-butyl-4-hydroxyphenyl)propionyloxymethyl]-1-methoxyethane.

3. The stabilizer for synthetic resins as claimed in claim 1, wherein the sulfur-containing compound (II-1) is tetrakis(3-dodecylthiopropionyloxymethyl)methane.

4. The stabilizer for synthetic resins as claimed in claim 1, wherein the sulfur-containing compound (II-2) is 3,9-bis(2-dodecylthioethyl-2,4,8,10-tetraoxaspiro[5,5]undecane.

5. The stabilizer for synthetic resins as claimed in any of claim 1 wherein the synthetic resins are polyolefin resins.

6. The stabilizer for synthetic resins as claimed in claim 5 wherein the polyolefin resin is polypropylene.

7. Phenolic compounds represented by the general formula:

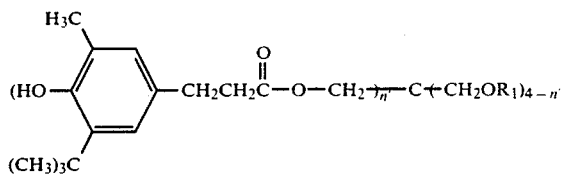

wherein n' is an integer from 1 to 3, and $R_1$ is a hydrogen atom or an alkyl group having 1 to 4 carbon atoms or an acyl group having 1 to 5 carbon atoms.

8. The compounds as claimed in claim 7 wherein the phenolic compound is 2,2,2-tris[3-(3-methyl-5-t-butyl-4-hydroxyphenyl)propionyloxymethyl]ethanol, 2,2,2-tris[3-(3-methyl-5-t-butyl-4-hydroxyphenyl)propionyloxymethyl]ethyl acetate, or 2,2,2-tris[3-(3-methyl-5-t-butyl-4-hydroxyphenyl)propionyloxymethyl]-1-methoxyethane.

9. A method of producing phenolic compounds represented by the general formula:

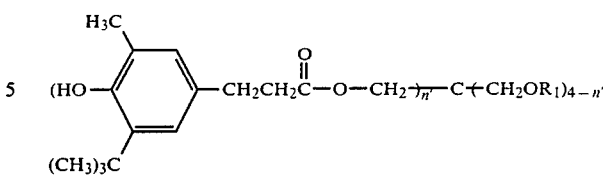

wherein n' is an integer from 1 to 3, and $R_1$ is a hydrogen atom, or an alkyl group having 1 to 4 carbon atoms or an acyl group having 1 to 5 carbon atoms, characterized by reacting a 3-(3-methyl-5-t-butyl-4-hydroxyphenyl)propionic acid represented by the general formula:

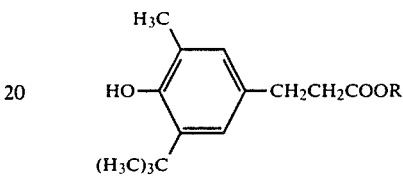

wherein R is a hydrogen atom or an alkyl group having 1 to 4 carbon atoms,
with a pentaerythritol represented by the general formula:

$(HOCH_2)_{n'}C\text{---}CH_2OR_1)_{4-n'}$ wherein n' and $R_1$ have the same meaning as previously mentioned.

10. The method as claimed in claim 9 wherein the molar ratio of the pentaerythritol to the 3-(3-methyl-5-t-butyl-4-hydroxyphenyl)propionic acid is 1:0.5–4.

11. The method as claimed in claim 9 wherein the reaction is carried out in the presence of an acidic or basic catalyst.

12. The method as claimed in claim 11 wherein the basic catalyst is potassium t-butoxide, sodium methoxide, sodium phenoxide or sodium hydroxide.

* * * * *